(12) United States Patent
Wu (10) Patent No.: US 7,760,839 B2
(45) Date of Patent: Jul. 20, 2010

(54) OFFSET CONTROLLABLE SPREAD SPECTRUM CLOCK GENERATOR APPARATUS

(75) Inventor: Shang-Hsiu Wu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1102 days.

(21) Appl. No.: 11/307,624

(22) Filed: Feb. 15, 2006

(65) Prior Publication Data
US 2007/0091986 A1 Apr. 26, 2007

(30) Foreign Application Priority Data
Oct. 26, 2005 (TW) .............................. 94137423 A (51) Int. Cl.
*H03D 3/24* (2006.01)
(52) U.S. Cl. ...................... 375/376; 375/148; 375/150; 327/158
(58) Field of Classification Search ................. 375/376, 375/148; 327/158
See application file for complete search history.

(56) References Cited

U.S. PATENT DOCUMENTS

| 5,457,718 | A  | * | 10/1995 | Anderson et al. | 375/373 |
| 6,501,309 | B1 | * | 12/2002 | Tomita | 327/158 |
| 7,010,014 | B1 | * | 3/2006 | Percey et al. | 375/130 |
| 2002/0140471 | A1 | * | 10/2002 | Fiscus | 327/158 |
| 2003/0102928 | A1 | * | 6/2003 | d'Haene et al. | 331/172 |
| 2006/0146971 | A1 | * | 7/2006 | Kaizuka | 375/376 |

* cited by examiner

*Primary Examiner*—David C Payne
*Assistant Examiner*—Tanmay K Shah
(74) *Attorney, Agent, or Firm*—Jianq Chyun IP Office (57) ABSTRACT

An offset controllable spread spectrum clock generator apparatus including a spread spectrum clock generator (SSCG), a controllable delay circuit, and a control unit is provided. The SSCG spreads the received original clock signal to output a spread spectrum clock signal. The controllable delay circuit delays the spread spectrum clock signal according to a control signal. The control unit makes statistical analyses of the spread spectrum clock signal according to the timing of the original clock signal, and adjusts and outputs the control signal to the controllable delay circuit according to the results of the statistical analyses.

9 Claims, 8 Drawing Sheets

OFFSET CONTROLLABLE SPREAD SPECTRUM CLOCK GENERATOR APPARATUS

CROSS-REFERENCE TO RELATED APPLICATION

This application claims the priority benefit of Taiwan application serial no. 94137423, filed on Oct. 26, 2005. All disclosure of the Taiwan application is incorporated herein by reference.

BACKGROUND OF THE INVENTION

1. Field of Invention

The present invention relates to a spread spectrum clock generator (SSCG). More particularly, the present invention relates to an offset controllable spread spectrum clock generator apparatus.

2. Description of Related Art

Figure 1:
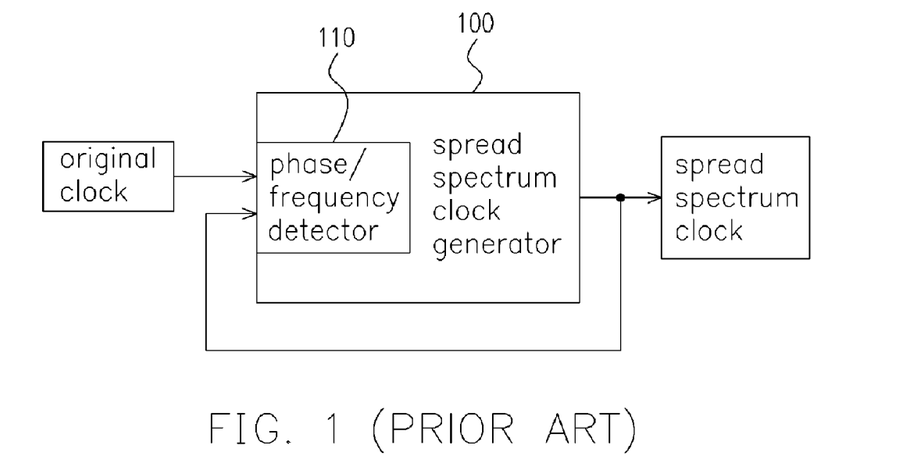
FIG. 1 is a block view of the conventional spread spectrum clock generator apparatus.
Figure 2:
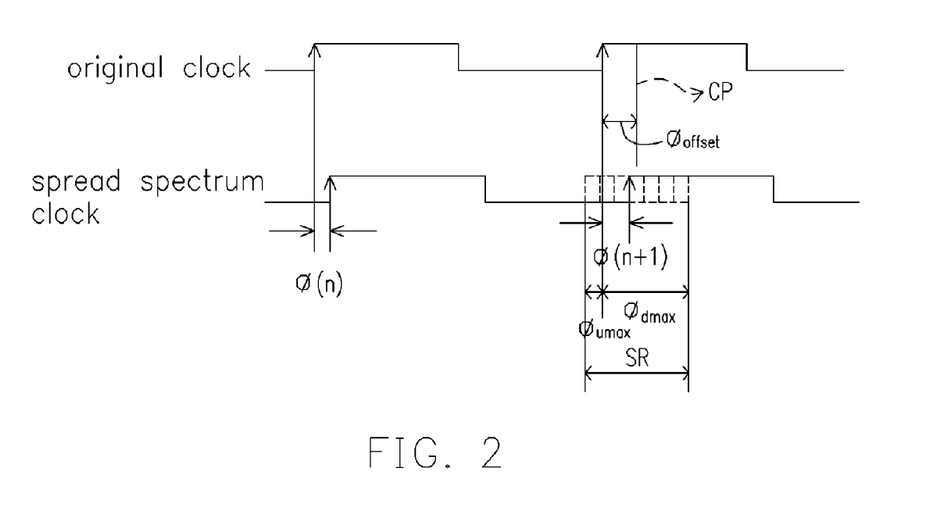
FIG. 2 is a timing view of the signal of the spread spectrum clock generator apparatus.

In an electronic circuit, a spread spectrum clock generator apparatus is usually used to disperse the frequency of the signal, to prevent the energy of the signal from concentrating on one frequency. An offset exists between the original clock at the input of the conventional SSCG and the center of the spread spectrum clock at the output end of the conventional SSCG. FIG. 1 is a block view of a conventional spread spectrum clock generator apparatus. FIG. 2 is a signal timing view of the spread spectrum clock generator apparatus. Referring to FIGS. 1 and 2, in general, the SSCG 100 includes a phase/frequency detector 110. A feedback path is connected to the input end of the phase/frequency detector 110 from the output end of the SSCG 100, while the other input end of the phase/frequency detector 110 receives the original clock signal. The phase/frequency detector 110 makes a determination according to the phase relationship between the input original clock signal and the spread spectrum clock signal, and sends out a phase correction signal. The SSCG 100 spreads the received original clock signal according to the phase correction signal, and sends out the spread spectrum clock signal from its output end. Therefore, each time a different phase difference exists between the rising edges of the original clock signal and the spread spectrum clock signal. For example, in FIG. 2, a phase difference $\phi(n)$ exists between the rising edges of the nth original clock and the nth spread spectrum clock, while a phase difference $\phi(n+1)$ exists between the rising edges of the (n+1)th original clock and the (n+1)th spread spectrum clock. Both of the above-mentioned nth and (n+1)th spread spectrum clocks lag behind the corresponding original clocks.

Because the SSCG 100 has the spectrum spreading function, the timing position of the rising edge of the spread spectrum clock signal varies with time. The timing position of the rising edge of the spread spectrum clock signal output by the SSCG 100 varies in the spreading range SR. The $\phi_{dmax}$ in FIG. 2 represents the largest phase difference of the rising edge of the spread spectrum clock lagging behind the rising edge of the original clock, while $\phi_{dmax}$ represents the largest phase difference of the rising edge of the spread spectrum clock leading the rising edge of the original clock. Moreover, CP in FIG. 2 represents the average center position of the spreading range SR.

The $\phi_{offset}$ (phase offset) is the time difference between the rising edge of the original clock and the average center position CP of the spread spectrum clock range SR. For the conventional SSCG 100, the offset $\phi_{offset}$ can be regarded as a fixed value after the circuit is activated, but it cannot be controlled at will. Different applications require different offsets $\phi_{offset}$ (for example, 0) of the spread spectrum clock signal. Under the circumstance of different modulating frequencies or spread spectrum amplitudes, the offset $\phi_{offset}$ cannot be set to a desired predetermined value in the conventional technology. Therefore, a spread spectrum clock generator apparatus capable of controlling the offset $\phi_{offset}$ is desired.

SUMMARY OF THE INVENTION

An object of the present invention is to provide an offset controllable spread spectrum clock generator apparatus, to adjust or eliminate the offset of the spread spectrum clock signal as required.

Based on the above-mentioned and other objects, the invention provides an offset controllable spread spectrum clock generator apparatus, which includes an SSCG, a controllable delay circuit, and a control unit. The SSCG spreads the received original clock signal and outputs a first spread spectrum clock signal. The controllable delay circuit is coupled to the SSCG to delay the first spread spectrum clock signal according to the control signal, and then output a second spread spectrum clock signal accordingly. The control unit is coupled to the controllable delay circuit, so as to make statistical analyses of the second spread spectrum clock signal according to the timing of the original clock signal, and adjust and output the control signal to the controllable delay circuit according to the results of the statistical analyses.

In another aspect, the invention provides an offset controllable spread spectrum clock generator apparatus, which includes an SSCG, a controllable delay circuit, and a control unit. The SSCG spreads the received original clock signal according to a feedback clock signal and outputs a spread spectrum clock signal. The controllable delay circuit is coupled to the SSCG to delay the spread spectrum clock signal according to the control signal, and then output the feedback clock signal accordingly. The control unit is coupled to the controllable delay circuit, so as to make statistical analyses of the spread spectrum clock signal according to the timing of the original clock signal, and adjust and output the control signal to the controllable delay circuit according to the results of the statistical analyses.

The invention employs the control unit to obtain the center position of the spread range of the output spread spectrum clock signal and control the delay time of the delay circuit accordingly, so the delay range of the output clock can be adjusted automatically, such that the center position of the spreading range of the output spread spectrum clock signal can be automatically adjusted to the predetermined position.

In order to the make the aforementioned and other objects, features and advantages of the present invention comprehensible, a preferred embodiment accompanied with figures is described in detail below.

DESCRIPTION OF EMBODIMENTS

Figure 3:
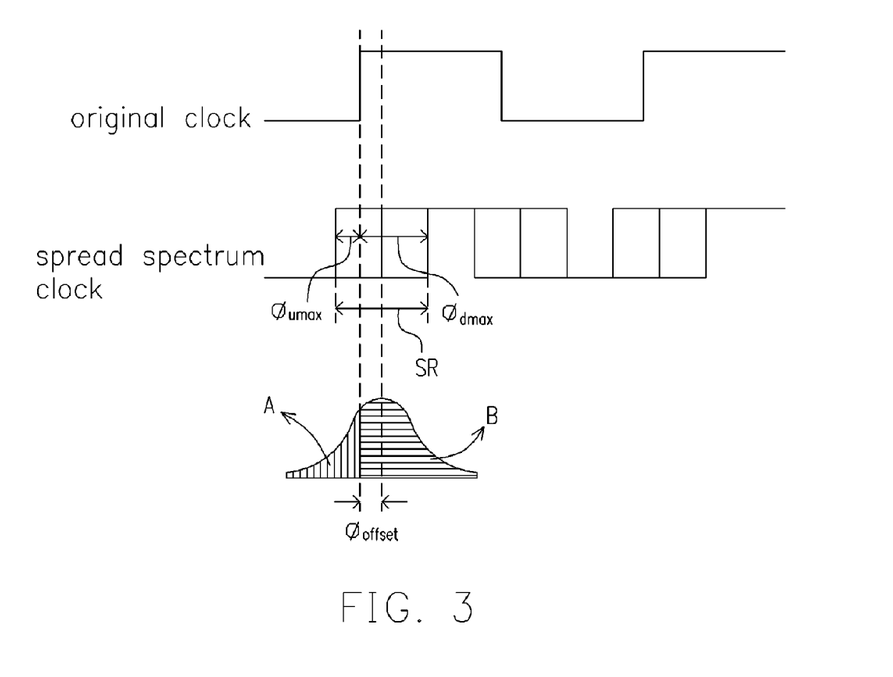
FIG. 3 is a timing view of the relationship between the original clock signal input to the SSCG and the spread spectrum clock signal output from the SSCG along the time axis on the time axis according to the invention.

FIG. 3 is a timing view of the relationship between the original clock signal input to the SSCG and the spread spectrum clock signal output from the SSCG along the time axis according to the invention. The distribution area SR of the rising edge of the spread spectrum clock signal is the spread spectrum range, and the average position of the rising edge falls at the center point of the distribution area SR. If a statistical analysis of the position of the rising edge of the spread spectrum clock signal is made, a bell shape distribution diagram can be obtained. This distribution diagram is symmetric along the average position of the rising edge of the output clock.

As shown in FIG. 3, the time difference between the rising edge of the original clock and the average position of the rising edge of the spread spectrum clock offset is defined as $\phi_{offset}$. The event of the rising edge of the spread spectrum clock on the left of the rising edge of the original clock (i.e., leading the rising edge of the original clock in time) is defined as the event A. The event of the rising edge of the spread spectrum clock on the right of the rising edge of the original clock (i.e., lagging behind the rising edge of the original clock in time) is defined as event B. The offset can be controlled according to the proportional relationship between the events A and B. For example, if the event A equals to the event B, the offset is zero. If the event A is larger than the event B, the average position of the rising edge of the spread spectrum clock leads the rising edge of the original clock. Otherwise, if the event A is smaller than the event B, the average position of the rising edge of the spread spectrum clock lags behind the rising edge of the original clock.

Figure 4:
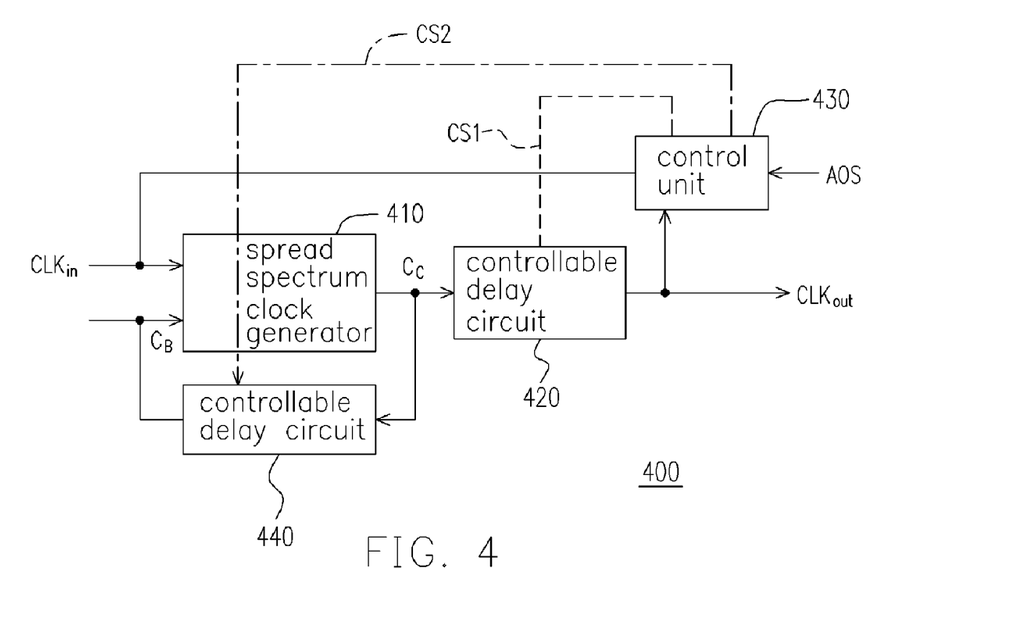
FIG. 4 is a block view of the offset controllable spread spectrum clock generator apparatus according to an embodiment of the invention.

FIG. 4 is a block view of an offset controllable spread spectrum clock generator apparatus according to an embodiment of the invention. Referring to FIGS. 3 and 4, the spread spectrum clock generator apparatus 400 includes an SSCG 410, a controllable delay circuit 420, a controllable delay circuit 440, and a control unit 430. The SSCG 410 spreads the received original clock signal $CLK_{in}$ and then outputs the spread spectrum clock signal $C_C$. The SSCG 410 can be any SSCG, and is not described in detail herein.

The controllable delay circuit 420 is coupled to the SSCG 410. The controllable delay circuit 420 receives the spread spectrum clock signal $C_C$, and delays the $C_C$ according to the control signal CS1, so as to output the delayed spread spectrum clock signal $CLK_{out}$. The controllable delay circuit 440 is also coupled to the SSCG 410. The controllable delay circuit 440 receives the spread spectrum clock signal $C_C$, and delays the $C_C$ according to the signal CS2, so as to output the delayed feedback clock signal $C_B$. The controllable delay circuits 420 and 440 can be voltage controlled delay circuits, digital control delay circuits, or any other delay time controllable delay circuits, and are not described in detail herein.

The control unit 430 is coupled to the controllable delay circuits 420 and 440. The control unit 430 samples and makes a statistical analysis of the second spread spectrum clock signal $CLK_{out}$ according to the timing of the original clock signal $CLK_{in}$. The control unit 430 respectively adjusts and outputs the control signal CS1 and CS2 to the controllable delay circuit 420 and 440 according to the result of the statistical analysis. For example, when the control unit 430 samples the spread spectrum clock signal $CLK_{out}$ according to the timing of the rising edge of the original clock signal $CLK_{in}$, if the sample result is of a low level, it means that the spread spectrum clock signal $CLK_{out}$ lags behind the original clock signal $CLK_{in}$ in time (i.e., the event B); otherwise, if the sample result is of a high level, it means that the spread spectrum clock signal $CLK_{out}$ leads the original clock signal $CLK_{in}$ in time (i.e., the event A). Therefore, the control unit 430 can figure out whether the offset $\phi_{offset}$ of the spread spectrum clock signal $CLK_{out}$ meets the predetermined value by making a statistical analysis of the proportional relationship between the events A and B. Therefore, the control unit 430 can control the delay time of the controllable delay circuits 420 and 440 respectively by adjusting and outputting the control signals CS1 and CS2. Accordingly, a feedback control loop is obtained to control the offset $\phi_{offset}$ (for example, eliminating the offset $\phi_{offset}$).

The predetermined offset of the aforementioned spread spectrum clock signal $CLK_{out}$ can be preset in the control unit 430. It is known to those skilled in the art that the control unit 430 can be designed to further receive the offset adjusting signal AOS, thereby determining the predetermined offset of the spread spectrum clock signal $CLK_{out}$ according to the offset adjusting signal AOS, and then adjusting the control signals CS1 and CS2 so as to control the delay time of the controllable delay circuits 420 and 440.

Figure 5:
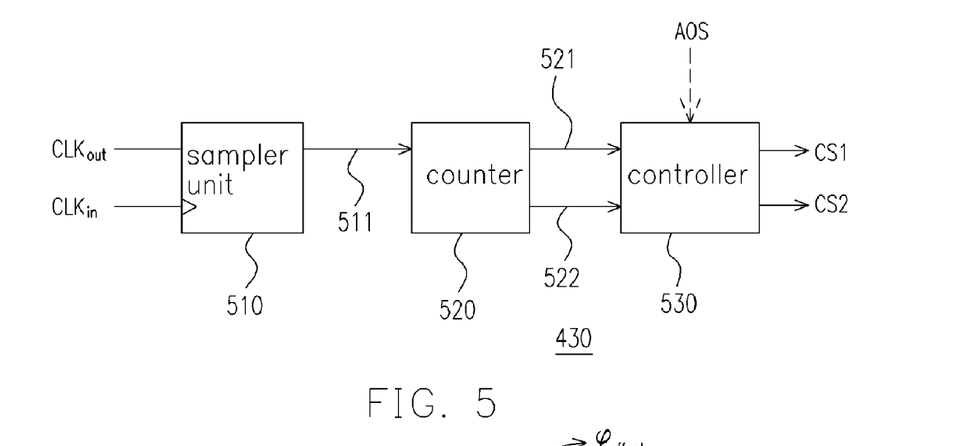
FIG. 5 shows an embodiment of the control unit 430 in FIG. 4 according to the invention.

The above-mentioned control unit 430 can be implemented according to FIG. 5. FIG. 5 shows an embodiment of the control unit 430 in FIG. 4 according to the invention. The control unit 430 includes a sampler unit 510, a counter 520, and a controller 530. Referring to FIGS. 3 and 5, the sampler unit can be a flip-flop or another circuit. That is, any logic circuit that can utilize the rising (or falling) edge of $CLK_{in}$ to sample the real-time $CLK_{out}$ can be taken as the embodiment of the sampler unit 510. The sampler unit 510 samples the spread spectrum clock signal $CLK_{out}$ according to the timing of the original clock signal $CLK_{in}$, and outputs the sample result 511. The counter 520 is coupled to the sampler unit 510. The counter 520 makes a statistical analysis of the sample result 511 of the sampler unit 510, and outputs the number of leading times 521 and the number of lagging times 522 accordingly. The number of lagging times 522 represents the number of times that the spread spectrum clock signal $CLK_{out}$ lagged behind the original clock signal $CLK_{in}$ (i.e., the event B). The number of leading times 521 represents the times that the spread spectrum clock signal $CLK_{out}$ leaded the original clock signal $CLK_{in}$ (i.e., the event A). The controller 530 is coupled to the counter 520. The controller 530 receives and compares the number of leading times 521 and the number of lagging times 522 (i.e., comparing the proportional relationship between the events A and B), and then determines whether the offset $\phi_{offset}$ of the spread spectrum clock signal $CLK_{out}$ meets the predetermined value according to the comparison result, thereby adjusting and outputting the control signals CS1 and CS2. The above-mentioned predetermined offset can be 0, so that the offset $\phi_{offset}$ of the spread spectrum clock signal $CLK_{out}$ is eliminated.

The above-mentioned predetermined offset of the spread spectrum clock signal $CLK_{out}$ can be preset in the control unit 530. It is known to those skilled in the art that the controller 530 can be designed to further receive the offset adjusting signal AOS, thereby determining the predetermined offset of the spread spectrum clock signal $CLK_{out}$ according to the offset adjusting signal AOS and then adjusting the control signals CS1 and CS2 to control the delay time of the controllable delay circuits 420 and 440.

Taking FIG. 3 as an example, when the rising edge of the spread spectrum clock signal $CLK_{out}$ is on the left of the rising edge of the original clock signal $CLK_{in}$, the sample result 511 of the sampler unit 510 is a logical true, and the event A is represented as a logical true. When the rising edge of the spread spectrum clock signal $CLK_{out}$ is on the right of the rising edge of the original clock signal $CLK_{in}$, the sample result 511 of the sampler unit 510 is a logical false, and the event B is represented as a logical false. Assuming that the offset $\phi_{offset}$ is adjusted to 0, the results of statistical analysis of the events A and B analyzed by the control unit 430 after started is shown in FIG. 3, wherein the event A is smaller than the event B, so the control unit 430 sends out the control signal CS1 of reducing the time delay to the controllable delay circuit 420, or sends out the control signal CS2 of reducing the time delay to the controllable delay circuit 440, until the event A is equal to the event B.

The following contents describe how the spread spectrum clock generator apparatus 400 eliminates the phase offset $\phi_{offset}$ and controls the control unit 430 to set the phase offset to a fixed value. In general, the timing relation between the original clock signal $CLK_{in}$ and the feedback clock signal $C_B$ is uncontrollable, so the following two situations exist, i.e. $\phi_{offset} \geq 0$ in FIG. 6A~6C and $\phi_{offset} \leq 0$ in FIG. 7A~7C. It is assumed here that the user wants to align the center position of the spread spectrum clock signal $CLK_{out}$ with the rising edge of the original clock signal $CLK_{in}$ (i.e., eliminating the phase offset). In the embodiments in FIGS. 6A~6C and 7A~7C, this purpose can be accomplished by adjusting the time delay from the spread spectrum clock signal $C_C$ to the feedback clock signal $C_B$, or by adjusting the time delay from the spread spectrum clock signal $C_C$ to the spread spectrum clock signal $CLK_{out}$.

Figure 6A:
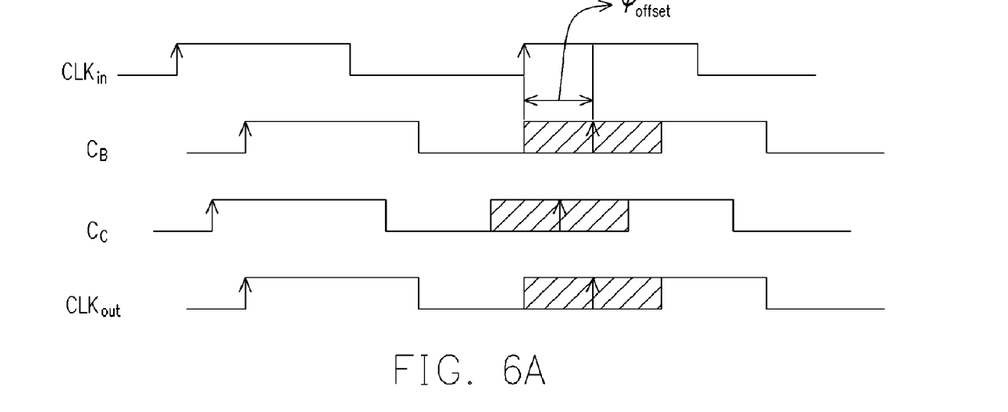
FIG. 6A-6C shows an embodiment of the signal timing in FIG. 4 according to the invention.

FIG. 6A~6C shows an embodiment of the signal timing in FIG. 4 according to the invention. Taking FIG. 6A as an example, referring to FIGS. 4 and 6A, when the signal CS2 is adjusted and the time delay of the controllable delay circuit 440 is thus increased, the $\phi_{offset}$ at this time can be regarded as a fixed value, so it can be equivalently regarded that the center position of the spread spectrum clock of the clock signal $C_C$ moves leftward. As the time delay from the clock signal $C_C$ to the spread spectrum clock signal $CLK_{out}$ is unchanged, the spread spectrum clock signal $CLK_{out}$ also moves leftward by an equal amount of time. The controllable delay circuit 440 is adjusted by the control signal CS2, until the center position of the spread spectrum clock of the spread spectrum clock signal $CLK_{out}$ is aligned with the rising edge of the original clock signal $CLK_{in}$, and then the control unit 430 stops increasing the time delay of the controllable delay circuit 440.

Figure 6B:
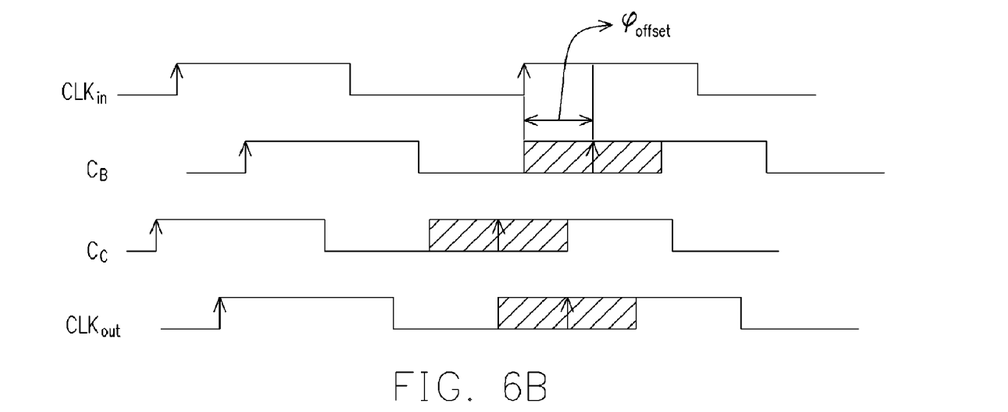

Furthermore, if the rising edge of the original clock signal $CLK_{in}$ falls right in the time period between the centers of the spread spectrum clock of the clock signal $C_C$ and the spread spectrum clock of the spread spectrum clock signal $CLK_{out}$ (as shown in FIG. 6B), the controllable delay circuit 420 can also be adjusted by the control signal CS1, to reduce the time delay from the clock signal $C_C$ to the spread spectrum clock signal $CLK_{out}$, until the center position of the spread spectrum clock of the spread spectrum clock signal $CLK_{out}$ is aligned with the rising edge of the original clock signal $CLK_{in}$. Or, the controllable delay circuit 440 can be adjusted by the control signal CS2, thus increasing the time delay from the clock signal $C_C$ to the feedback clock signal $C_B$, until the center position of the spread spectrum clock of the spread spectrum clock signal $CLK_{out}$ is aligned with the rising edge of the original clock signal $CLK_{in}$. Of course, the controllable delay circuits 420 and 440 can be adjusted at the same time, for respectively reducing the delay time of the controllable delay circuit 420, and prolonging the delay time of the controllable delay circuit 440.

Figure 6C:
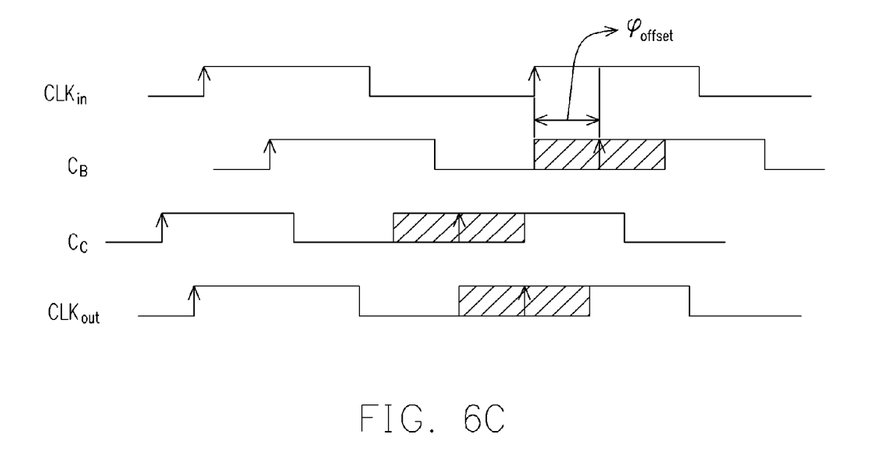

Moreover, if the rising edge of the original clock signal $CLK_{in}$ leads the center of the spread spectrum of the feedback clock signal $C_B$, and the center positions of the spread spectrum of the clock signal $C_C$ and the spread spectrum clock signal $CLK_{out}$ both lead the original clock signal $CLK_{in}$ (as shown in FIG. 6C), the controllable delay circuit 420 can be adjusted by the control signal CS1, to prolong the time delay from the clock signal $C_C$ to the spread spectrum clock signal $CLK_{out}$, until the center position of the spread spectrum clock of the spread spectrum clock signal $CLK_{out}$ is aligned with the rising edge of the original clock signal $CLK_{in}$. Or, the controllable delay circuit 440 can be adjusted by the control signal CS2, to reduce the time delay from the clock signal $C_C$ to the feedback clock signal $C_B$, until the center position of the spread spectrum clock of the spread spectrum clock signal $CLK_{out}$ is aligned with the rising edge of the original clock signal $CLK_{in}$. Of course, the controllable delay circuits 420 and 440 can also be adjusted at the same time, for respectively prolonging the delay time of the controllable delay circuit 420, and reducing the delay time of the controllable delay circuit 440.

Figure 7A:
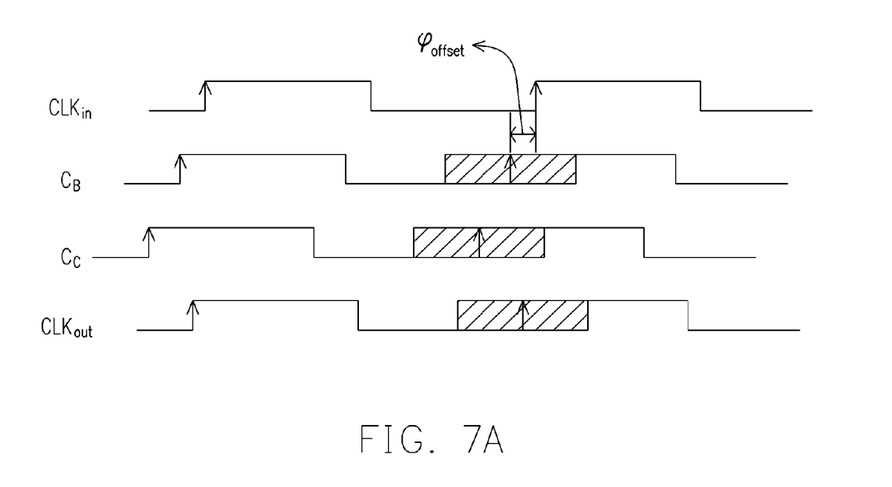
FIG. 7A-7C shows another embodiment of the signal timing in FIG. 4 according to the invention.

FIG. 7A~7C shows another embodiment of the signal timing in FIG. 4 according to the invention. Taking FIG. 7A as an example, referring to FIGS. 4 and 7A, the rising edge of the original clock signal $CLK_{in}$ lags behind the center positions of the spread spectrum of the feedback clock signal $C_B$, the clock signal $C_C$, and the spread spectrum clock signal $CLK_{out}$, and the center of the spread spectrum of the feedback clock signal $C_B$ falls between the clock signal $C_C$ and the original clock signal $CLK_{in}$. When the time delay of the controllable delay circuit 420 is increased by adjusting the control signal CS1, the spread spectrum clock signal $CLK_{out}$ will move rightward until the center position of the spread spectrum clock of the spread spectrum clock signal $CLK_{out}$ is aligned with the rising edge of the original clock signal $CLK_{in}$. Or, the controllable delay circuit 440 can be adjusted by the control signal CS2, to reduce the time delay of the controllable delay circuit 440, until the center position of the spread spectrum clock of the spread spectrum clock signal $CLK_{out}$ is aligned with the rising edge of the original clock signal $CLK_{in}$. Of course, the controllable delay circuits 420 and 440 can also be adjusted at the same time, for respectively prolonging the delay time of the controllable delay circuit 420, and reducing the delay time of the controllable delay circuit 440.

Figure 7B:
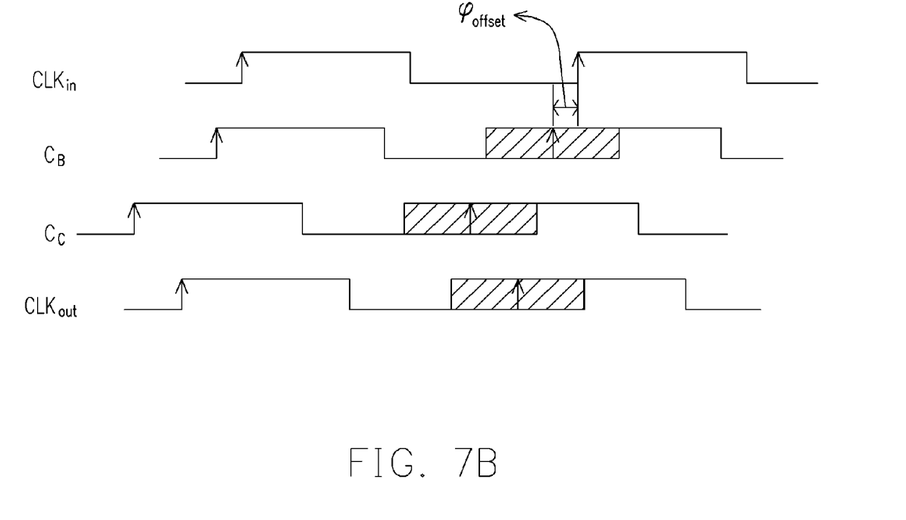

If the rising edge of the original clock signal $CLK_{in}$ lags behind the center positions of the spread spectrum of the feedback clock signal $C_B$, the clock signal $C_C$, and the spread spectrum clock signal $CLK_{out}$, and the center of the spread spectrum of the feedback clock signal $C_B$ lags behind the centers of the spread spectrum of the clock signal $C_C$ and the original clock signal $CLK_{in}$ (as shown in FIG. 7B), the controllable delay circuit 420 can be adjusted by the control signal CS1, to prolong the time delay of the controllable delay circuit 420, until the center position of the spread spectrum clock of the spread spectrum clock signal $CLK_{out}$ is aligned with the rising edge of the original clock signal $CLK_{in}$. Or, the controllable delay circuit 440 can be adjusted by the control signal CS2, to reduce the time delay of the controllable delay circuit 440, until the center position of the spread spectrum clock of the spread spectrum clock signal $CLK_{out}$ is aligned with the rising edge of the original clock signal $CLK_{in}$. Of course, the controllable delay circuits 420 and 440 can also be adjusted at the same time, for respectively prolonging the delay time of the controllable delay circuit 420, and reducing the delay time of the controllable delay circuit 440.

Figure 7C:
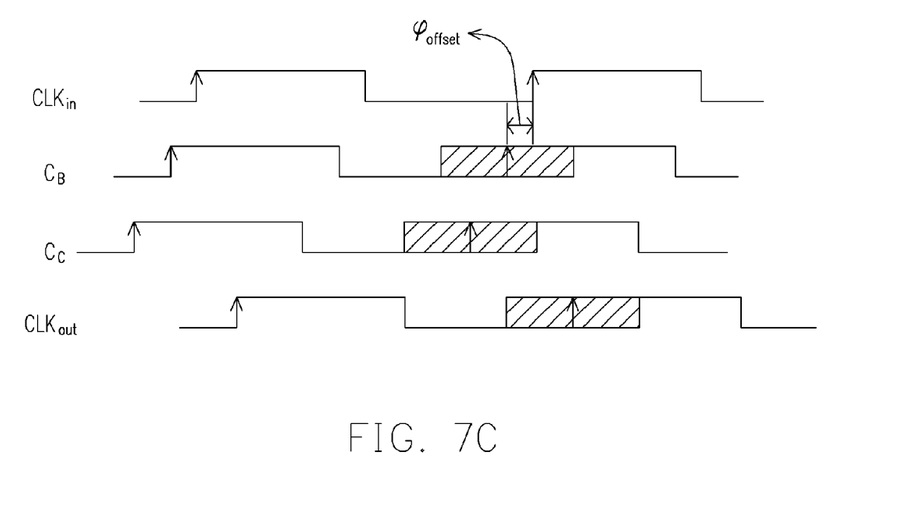

If the rising edge of the original clock signal $CLK_{in}$ lags behind the center positions of the spread spectrum of the feedback clock signal $C_B$ and the clock signal $C_C$, and the rising edge of the original clock signal $CLK_{in}$ leads the center of the spread spectrum of the spread spectrum clock signal $CLK_{out}$ (as shown in FIG. 7C), the controllable delay circuit 420 can be adjusted by the control signal CS1, to reduce the time delay of the controllable delay circuit 420, until the center position of the spread spectrum clock of the spread spectrum clock signal $CLK_{out}$ is aligned with the rising edge of the original clock signal $CLK_{in}$. Or, the controllable delay circuit 440 can be adjusted by the control signal CS2, to prolong the time delay of the controllable delay circuit 440, until the center position of the spread spectrum clock of the spread spectrum clock signal $CLK_{out}$ is aligned with the rising edge of the original clock signal $CLK_{in}$. Of course, the controllable delay circuits 420 and 440 can also be adjusted at the same time, for respectively reducing the delay time of the controllable delay circuit 420, and prolonging the delay time of the controllable delay circuit 440.

Furthermore, if the difference between the center position of the spread spectrum clock of the spread spectrum clock signal $CLK_{out}$ and the rising edge of the original clock signal $CLK_{in}$ is small enough, the time delay of the controllable delay circuit 440 can also be reduced by adjusting the control signal CS2. The $\phi_{offset}$, at this time regarded as a fixed value, can be equivalently regarded that the center position of the spread spectrum clock of the clock signal $C_C$ moves rightward. Because the time delay from the clock signal $C_C$ to the spread spectrum clock signal $CLK_{out}$ is unchanged, the spread spectrum clock signal $CLK_{out}$ also moves rightward by an equal amount of time. The controllable delay circuit 440 is adjusted until the center position of the spread spectrum clock of the spread spectrum clock signal $CLK_{out}$ is aligned with the rising edge of the original clock signal $CLK_{in}$, and then the control unit 430 stops reducing the time delay of the controllable delay circuit 440. Those skilled in the art can understand that the controllable delay circuit 420 or the controllable delay circuit 440 can be omitted as desired. Alterations of the foregoing embodiments also fall within the scope of the present invention.

Figure 8:
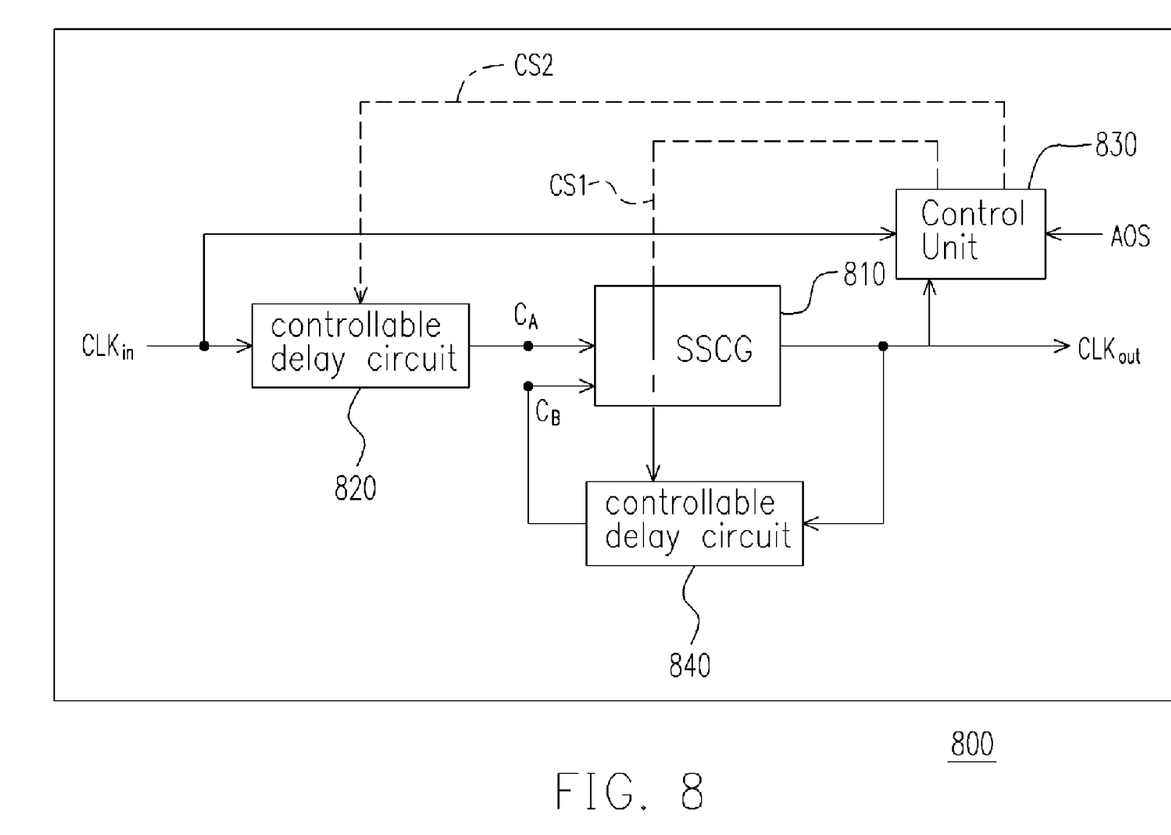
FIG. 8 is a block view of the offset controllable spread spectrum clock generator apparatus according to another embodiment of the invention.

FIG. 8 is a block view of another offset controllable spread spectrum clock generator apparatus according to an embodiment of the invention. Referring to FIGS. 3 and 8, the spread spectrum clock generator apparatus 800 includes a SSCG 810, a controllable delay circuit 820, a controllable delay circuit 840, and a control unit 830. The controllable delay circuit 820 delays the received original clock signal $CLK_{in}$ according to the control signal CS1, for outputting the delay clock signal $C_A$. The SSCG 810 is coupled to the controllable delay circuit 820. The spread spectrum clock generator 810 spreads the received delay clock signal $C_A$ and then outputs the spread spectrum clock signal $CLK_{out}$. The SSCG 810 can be any SSCG, which will not be described in detail herein.

The controllable delay circuit 840 is also coupled to the SSCG 810. The controllable delay circuit 840 receives the spread spectrum clock signal $CLK_{out}$, and delays the $CLK_{out}$ according to the control signal CS2, so as to output the delayed feedback clock signal $C_B$. The above-mentioned controllable delay circuits 820 and 840 can be voltage controlled delay circuits, digital control delay circuits, or any other delay time controllable delay circuits, and are not described in detail herein.

The control unit 830 is coupled to the controllable delay circuits 820 and 840. The control unit 830 samples and makes a statistical analysis of the spread spectrum clock signal $CLK_{out}$ according to the timing of the original clock signal $CLK_{in}$. The control unit 830 respectively adjusts and outputs the control signals CS1, CS2 to the controllable delay circuits 820 and 840 in accordance with the results of the above statistical analysis. For example, when the control unit 830 samples the spread spectrum clock signal $CLK_{out}$ according to the timing of rising edge of the original clock signal $CLK_{in}$. If the sample result is of a low level, it means that the spread spectrum clock signal $CLK_{out}$ lags behind the original clock signal $CLK_{in}$ in time (i.e., event B); otherwise, if the sample result is of a high level, it means that the spread spectrum clock signal $CLK_{out}$ leads the original clock signal $CLK_{in}$ (i.e., event A). Therefore, the control unit 830 can figure out whether the offset of the spread spectrum clock signal $CLK_{out}$ meets the predetermined value by making a statistical analysis of the proportional relationship between the events A and B. Thus, the control unit 830 can respectively control the delay time of the controllable delay circuits 820 and 840 by adjusting and outputting the control signals CS1 and CS2. Accordingly, a feedback control loop is obtained to control the offset (for example, eliminating the offset).

The above-mentioned predetermined offset of the spread spectrum clock signal $CLK_{out}$ can be preset in the control unit 830. It is known to those skilled in the art that the control unit 830 can be designed to further receive the offset adjusting signal AOS, thereby determining the predetermined offset of the spread spectrum clock signal $CLK_{out}$ according to the offset adjusting signal AOS, and then adjusting the control signals CS1 and CS2, to control the delay time of the controllable delay circuits 820 and 840. The aforementioned control unit 830 can be implemented according to FIG. 5. The detailed embodiment of FIG. 5 is illustrated with reference to the above embodiments, so it will not be described in detail herein.

The following contents describe how the spread spectrum clock generator apparatus 800 eliminates the phase offset between the original clock signal $CLK_{in}$ and the spread spectrum clock signal $CLK_{out}$, and controls the control unit 830 to set the phase offset to a fixed value. In FIGS. 9A~9B and FIGS. 10A~10B, the phase offset $\phi_{offset}$ represents the phase offset between two input signals of the spread spectrum clock generator 810. In general, the phase relation $_{offset}$ between the delay clock signal $C_A$ and the feedback clock signal $C_B$ is uncontrollable, so the following two situations exist, i.e., $_{offset} \geq 0$ in FIGS. 9A~9B and $_{offset} \leq 0$ in FIGS. 10A~10B. It is assumed here that the user wants to align the center position of the spread spectrum clock signal $CLK_{out}$ with the rising edge of the original clock signal $CLK_{in}$ (i.e., eliminating the phase offset). In the embodiments in FIGS. 9A~9B and FIGS. 10A·10B, this purpose can be accomplished by adjusting the delay time of the controllable delay circuit 820, or by adjusting the delay time of the controllable delay circuit 840. Those skilled in the art can understand that the controllable delay circuit 820 or the controllable delay circuit 840 can be omitted as desired. Alterations in the foregoing embodiments also fall within the scope of the present invention.

Figure 9A:
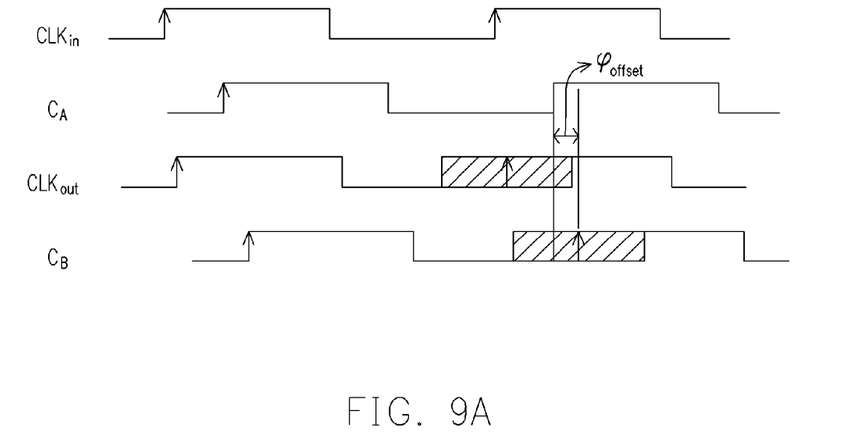
FIG. 9A-9B shows an embodiment of the signal timing in FIG. 8 according to the invention.

FIGS. 9A~9B show an embodiment of the signal timing in FIG. 8 according to the invention. Take FIG. 9A as an example, when the center of the spread spectrum of the delay clock signal $C_A$ leads that of the feedback clock signal $C_B$, and the center of the spread spectrum of the delay clock signal $C_A$ falls between the centers of the spread spectrum of the feedback clock signal $C_B$ and the spread spectrum clock signal $CLK_{out}$, the delay time of the controllable delay circuit 840 can be prolonged by the control signal CS2, until the center position of the spread spectrum clock of the spread spectrum clock signal $CLK_{out}$ is aligned with the rising edge of the original clock signal $CLK_{in}$, and then the control unit 830 stops increasing the time delay of the controllable delay circuit 840. Or, the controllable delay circuit 820 can be adjusted by the control signal CS1, to reduce the delay time of the controllable delay circuit 820, until the center position of the spread spectrum clock of the spread spectrum clock signal $CLK_{out}$ is aligned with the rising edge of the original clock signal $CLK_{in}$. Of course, the controllable delay circuits 820 and 840 can also be adjusted at the same time, for respectively reducing the delay time of the controllable delay circuit 820, and prolonging the delay time of the controllable delay circuit 840.

Figure 9B:
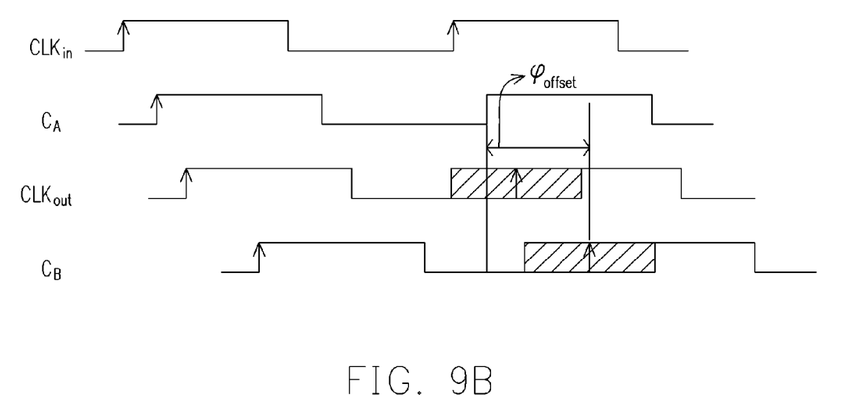

Moreover, if the center of the spread spectrum of the clock signal $C_A$ leads that of the feedback clock signal $C_B$, and the center of the spread spectrum of the delay clock signal $C_A$ leads the centers of the spread spectrum of the feedback clock signal $C_B$ and the spread spectrum clock signal $CLK_{out}$ (as shown in FIG. 9B), the controllable delay circuit 840 can be adjusted by the control signal CS2, to prolong the delay time of the controllable delay circuit 840, until the center position of the spread spectrum clock of the spread spectrum clock signal $CLK_{out}$ is aligned with the rising edge of the original clock signal $CLK_{in}$. Or, the controllable delay circuits 820 and 840 can be adjusted at the same time, for respectively reducing the delay time of the controllable delay circuit 820, and prolonging the delay time of the controllable delay circuit 840, until the center position of the spread spectrum clock of the spread spectrum clock signal $CLK_{out}$ is aligned with the rising edge of the original clock signal $CLK_{in}$.

Figure 10A:
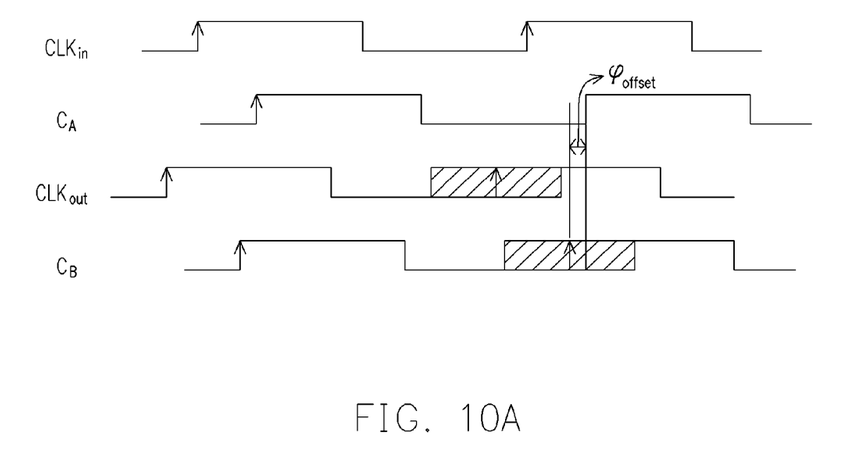
FIG. 10A-10B shows another embodiment of the signal timing in FIG. 8 according to the invention.

FIGS. 10A~10B show another embodiment of the signal timing in FIG. 8 according to the invention. Take FIG. 10A for example, referring to FIGS. 8 and 10A, the center of the spread spectrum of the delay clock signal $C_A$ lags behind that of the feedback clock signal $C_B$, and the rising edge of the original clock signal $CLK_{in}$ falls between the centers of the spread spectrum of the feedback clock signal $C_B$ and the spread spectrum clock signal $CLK_{out}$. The spread spectrum clock signal $CLK_{out}$ will move rightward until the center position of the spread spectrum clock of the spread spectrum clock signal $CLK_{out}$ is aligned with the rising edge of the original clock signal $CLK_{in}$ by adjusting the control signal CS1 to increase the delay time of the controllable delay circuit 820. Or, the controllable delay circuit 840 can be adjusted by the control signal CS2, to reduce the time delay of the controllable delay circuit 840, until the center position of the spread spectrum clock of the spread spectrum clock signal $CLK_{out}$ is aligned with the rising edge of the original clock signal $CLK_{in}$. Of course, the controllable delay circuits 820 and 840 can also be adjusted at the same time, for respectively prolonging the delay time of the controllable delay circuit 820, and reducing the delay time of the controllable delay circuit 840.

Figure 10B:
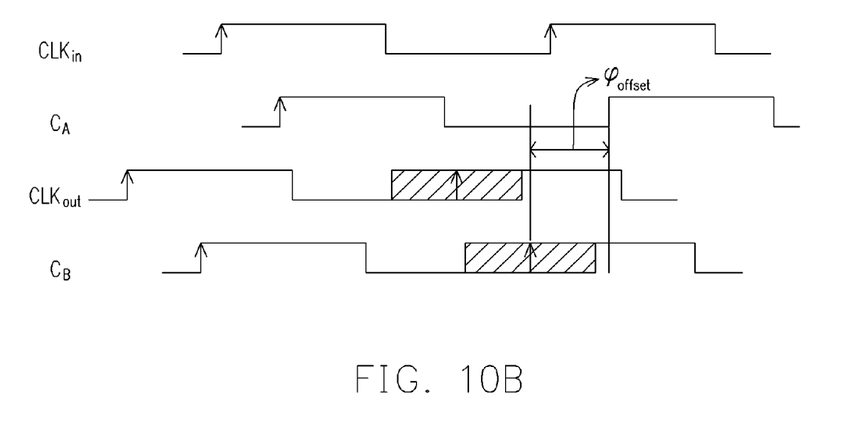

If the center of the spread spectrum of the clock signal $C_A$ lags behind that of the feedback clock signal $C_B$, and the center of the spread spectrum of the feedback clock signal $C_B$ leads the rising edge of the original clock signal $CLK_{in}$ (as shown in FIG. 10B), the controllable delay circuit 820 can be adjusted by the control signal CS1, to prolong the delay time of the controllable delay circuit 820, until the center position of the spread spectrum clock of the spread spectrum clock signal $CLK_{out}$ is aligned with the rising edge of the original clock signal $CLK_{in}$. Or, the controllable delay circuits 820 and 840 can also be adjusted at the same time, for respectively prolonging the delay time of the controllable delay circuit 820, and reducing the delay time of the controllable delay circuit 840, until the center position of the spread spectrum clock of the spread spectrum clock signal $CLK_{out}$ is aligned with the rising edge of the original clock signal $CLK_{in}$.

In view of the above, the invention employs the control unit to make a statistical analysis of the center position of the spread range of the output spread spectrum clock signal, and control the delay time of the delay circuit accordingly, so the delay range of the output clock can be adjusted automatically to fine-tune the center position of the spread range of the spread spectrum clock signal to the predetermined position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An offset controllable spread spectrum clock generator apparatus, comprising:
    a spread spectrum clock generator (SSCG), for spreading a received original clock signal and outputting a first spread spectrum clock signal;
    a controllable delay circuit coupled to the SSCG, for delaying the first spread spectrum clock signal according to a control signal to output a second spread spectrum clock signal; and
    a control unit coupled to the controllable delay circuit, for making statistical analyses of the second spread spectrum clock signal according to the timing of the original clock signal, and adjusting and outputting the control signal to the controllable delay circuit according to the results of the statistical analyses;
    wherein the control unit comprises:
    a sampler unit, for sampling the second spread spectrum clock signal according to the timing of the original clock signal to output a sample result;
    a counter coupled to the sampler unit, for making statistical analyses of the sample result and outputting a number of leading times and a number of lagging times accordingly; and
    a controller coupled to the counter, for receiving and comparing the number of leading times and the number of lagging times, and adjusting and outputting the control signal according to the comparison result.

2. The offset controllable spread spectrum clock generator apparatus according to claim 1, wherein the control unit further adjusts the control signal according to an offset adjusting signal to control the delay time of the controllable delay circuit.

3. The offset controllable spread spectrum clock generator apparatus according to claim 1, wherein the controller further adjusts the control signal according to an offset adjusting signal to control the delay time of the controllable delay circuit.

4. An offset controllable spread spectrum clock generator apparatus, comprising:
    a spread spectrum clock generator (SSCG), for spreading a received original clock signal and outputting a spread spectrum clock signal according to a feedback clock signal;

a controllable delay circuit coupled to the SSCG, for delaying the spread spectrum clock signal according to a control signal, and outputting the feedback clock signal accordingly; and a control unit coupled to the controllable delay circuit, for making statistical analyses of the spread spectrum clock signal according to the timing of the original clock signal, and adjusting and outputting the control signal to the controllable delay circuit according to the results of the statistical analyses;

wherein the control unit comprises:

a sampler unit, for sampling the spread spectrum clock signal according to the timing of the original clock signal, to output a sample result;

a counter coupled to the sampler unit, for making statistical analyses of the sample result and outputting a number of leading times and a number of lagging times accordingly; and a controller coupled to the counter, for receiving and comparing the number of leading times and the number of lagging times, and then adjusting and outputting the control signal according to the comparison result.

5. The offset controllable spread spectrum clock generator apparatus according to claim 4, wherein the control unit further adjusts the control signal according to an offset adjusting signal, to control the delay time of the controllable delay circuit.

6. The offset controllable spread spectrum clock generator apparatus according to claim 4, wherein the controller further adjusts the control signal according to an offset adjusting signal, to control the delay time of the controllable delay circuit.

7. An offset controllable spread spectrum clock generator apparatus, comprising:

a controllable delay circuit, for delaying a received original clock signal according to a control signal to output a delay clock signal;

a SSCG, coupled to the controllable delay circuit, for spreading the received delay clock signal and then outputting a spread spectrum clock signal; and a control unit, coupled to the controllable delay circuit and the SSCG, for making statistical analyses of the spread spectrum clock signal according to the timing of the original clock signal, and adjusting and outputting the control signal to the controllable delay circuit according to the results of the statistical analyses;

wherein the control unit comprises:

a sampler unit, for sampling the spread spectrum clock signal according to the timing of the original clock signal, to output a sample result;

a counter, coupled to the sampler unit, for making statistical analyses of the sample result and outputting a number of leading times and a number of lagging times accordingly; and a controller, coupled to the counter, for receiving and comparing the number of leading times and the number of lagging times, and then adjusting and outputting the control signal according to the comparison result.

8. The offset controllable spread spectrum clock generator apparatus according to claim 7, wherein the control unit further adjusts the control signal according to an offset adjusting signal to control the delay time of the controllable delay circuit.

9. The offset controllable spread spectrum clock generator apparatus according to claim 7, wherein the controller further adjusts the control signal according to an offset adjusting signal to control the delay time of the controllable delay circuit.

* * * * *